United States Patent [19]

Iwamoto et al.

[11] 4,453,110
[45] Jun. 5, 1984

[54] STROBO FLASH APPARATUS

[75] Inventors: Akira Iwamoto; Reiji Hirata, both of Osaka; Hikoya Yako, Takatsuki, all of Japan

[73] Assignee: West Electric Company, Ltd., Osaka, Japan

[21] Appl. No.: 465,455

[22] Filed: Feb. 10, 1983

[30] Foreign Application Priority Data

Feb. 18, 1982 [JP] Japan .................. 57-25442

[51] Int. Cl.³ .......................................... H05B 41/32
[52] U.S. Cl. .................................... 315/241 P; 362/9; 362/13
[58] Field of Search ............................ 315/241 P, 324; 362/7-9, 13; 354/132, 135, 141, 145

[56] References Cited

U.S. PATENT DOCUMENTS 3,919,538 11/1975 Yata et al. ................................ 362/9
4,410,250 10/1983 Curran .............................. 354/141 X

FOREIGN PATENT DOCUMENTS 1447880 12/1968 Fed. Rep. of Germany .......... 362/9

Primary Examiner—Eugene R. Laroche
Attorney, Agent, or Firm—Cushman, Darby & Cushman

[57] ABSTRACT

In a strobo flash apparatus comprising a power source part and an exchangeable flashing part, the power source part includes a DC-DC converter circuit for inducing a D.C. high voltage and has a connecting plate with its edge parts are formed as grooves, the exchangeable flashing part includes a flashing discharge tube and has a connecting recess for receiving the connecting plate said recess having protrusions for engaging with the grooves.

3 Claims, 5 Drawing Figures

STROBO FLASH APPARATUS

BACKGROUND OF THE INVENTION

1. Field of the Invention

The present invention relates to an improvement in a strobo flash apparatus.

2. Description of the Prior Art

It is common knowledge that most of strobo flash apparatus comrprises a power source part and a flashing part. The power source part includes a D.C. low voltage battery and a DC-DC converter for inducing a D.C. high voltage. And the flashing part gets a supply of an electric energy from the power source part and acts a flashing operation.

Regarding only to the power source part, the part lends itself to many uses. But in the conventional strobo flash apparatus, one flashing part is produced for corresponding one power source part, and generally the both parts are integral. Therefore, the power source part is not employed efficiently enough, and in case where more than two kinds of flashing apparatus is required to be carried, plural strobo flash apparatus must be carried each having rather heavy and expensive power source part.

SUMMARY OF THE INVENTION

Therefore, the present invention purposes to provide a strobo flash apparatus comprising a power source part which includes a DC-DC converter for inducing a D.C. high voltage, and is formed independently for adaptation to a variety of flashing parts or any other electric apparatus.

DESCRIPTION OF THE PREFERRED EMBODIMENTS

A strobo flash apparatus has a power source part including a DC-DC converter circuit for inducing a D.C. high voltage and a flashing part including a flashing means, wherein the power source part formed separately from the flashing part comprising:

a connecting plate member disposed on an upper face of a housing of the power source part and to form a grooves at least both at and under its right and left side edges thereof for a connection with the flashing part, sockets having contacts for supplying the D.C. high voltage, a stopper means having a stopper pin projected outside by an elasticity, and the flashing part comprising:

a connecting recess formed on a housing of the flashing part correspondingly to the connecting plate, a protrusion formed on the housing of the flashing part for engaging with the grooves of the connecting plate, an indent formed on the housing of the flashing part for engaging with the stopper pin of the stopper means, contact pins projected outside from the housing of the flashing part for a connection with the socket.

Figure 1A:
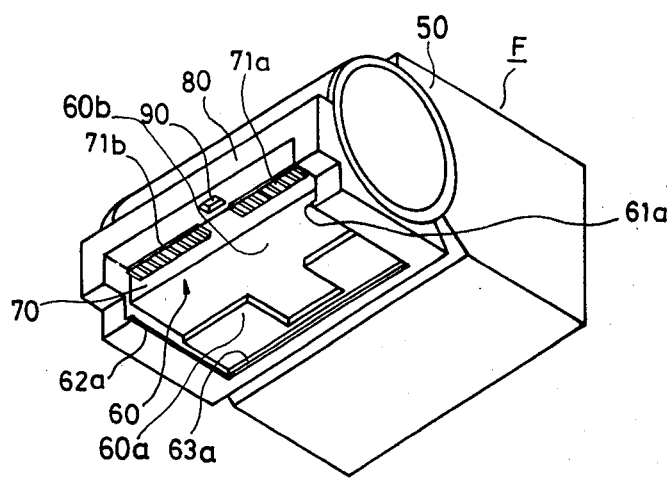
FIG. 1(a) is a perspective view showing a flashing part of a strobo flash apparatus of an embodiment of the present invention.
Figure 1B:
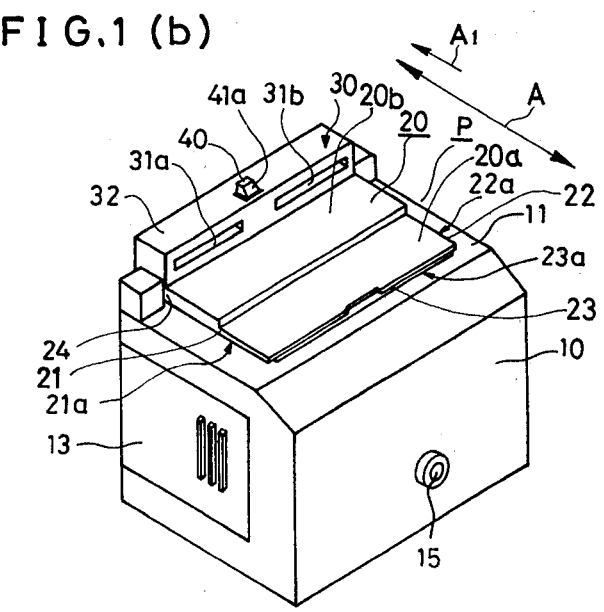
FIG. 1(b) is a perspective view showing a power source part of a strobo flash apparatus of an embodiment of the present invention.
Figure 1C:
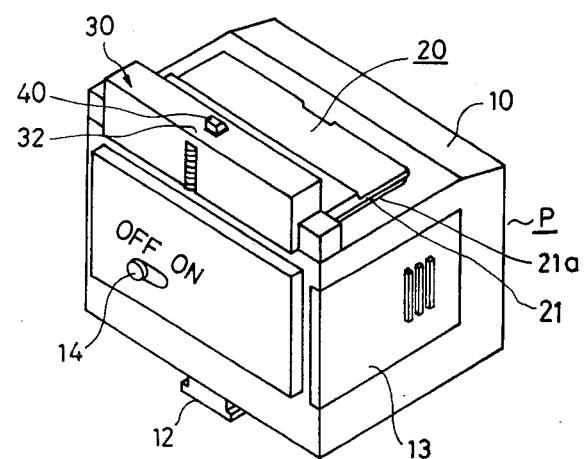
FIG. 1(c) is a perspective view from the back thereof showing the power source part shown in FIG. 1(b).

A power source part P of a strobo flash apparatus of an embodiment of the present invention which is shown in FIG. 1(b) and FIG. 1(c) has a housing 10, which is formed connectably separable from an exchangeable flashing part F such as an embodiment shown in FIG. 1(a). The power source part P includes a DC-DC converter for inducing a D.C. high voltage.

As one can easily understand from FIG. 1(b) and FIG. 1(c), the power source part P has a connector (we call it a hot shoe) 12 for making a connection with a camera (not shown), a battery holder 13, a power switch 14 and a photo sensor 15. A connecting plate member 20 is disposed on an upper face 11 of the housing 10, forming grooves 21a, 22a and 23a, formed at and under both side edges 21, 22 and a front edge 23 of the connecting plate member 20. In this embodiment, the connecting plate member 20 is shaped to be a step, with its front half part 20a being lower than the back half part 20b. A socket supporting member 30 of rectangular parallelepiped is disposed integral with a back end 24 of the connecting plate member 20.

Figure 1D:
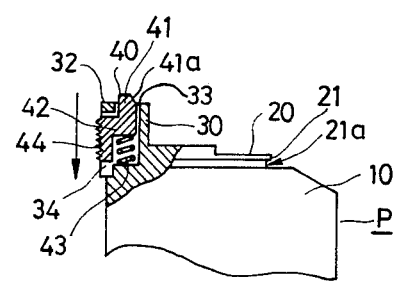
FIG. 1(d) is a partial sectional view of the power source part shown in FIG. 1(b).

Sockets 31a, 31b having contacts inside thereof for supplying a D.C. high voltage therethrough are formed hollowly in a front face of the socket supporting member 30. A stopper pin 40 having a sloped face 41a at front side thereof is disposed protruding at the center of an upper face 32 of the socket supporting member 30. As shown in a partial sectional view of FIG. 1(d) of the power source part P, an upper protrusion 41 of the stopper pin 40 projects through a hole 33 bored at the upper face 32 of the socket supporting member 30. The stopper pin 40 is pressed to upward by a compression spring 43 at a bending portion 42 thereof. A lower part of the stopper segment 40 is exposed outside from the back of the socket supporting member 30 through a hole 34 bored therein, and its lower part forms a release knob 44. The stopper pin 40 is movable downward by pulling down operation of the release knob 44 as indicated by arrow.

FIG. 1(a) is a sectional view showing a flashing part F of an embodiment of the present invention. The flashing part F has a main capacitor and a strobo flash tube (both are not shown) in a housing 50 thereof. A connecting recess 60 corresponding to the connecting plate member 20 of above-mentioned power source part P is formed at a lower face of the housing 50. In this embodiment, the connecting recess 60 is formed relatively backward on the housing 50. Protruding edges 61a, 62a and 63a which should be slidingly set in the grooves 21a, 22a and 23a of the connecting plate member 20 are disposed respectively at inner side of right and left brinks and front brink of the connecting recess 60. In this embodiment, an upper bottom face of the connecting recess 60 is formed in a step, the front half part 60a and the back half part 60b being for contacts to the step's faces 20a, 20b of the connecting plate member 20, respectively. A lower back portion of the housing 50 are formed as a contact pin supporting member 70.

Contact pins 71a, 71b are supported by the contact pin supporting member 70 projecting backward from the member 70 so as to make a connection with the sockets 31a, 31b of the power source part P of FIG. 1(b). A rectangular parallelepiped overhanging member 80 is formed integral with an upper portion of the contact pin supporting member 70. An engaging indent 90 is formed on the bottom face of the overhanging member 80 for engaging with the stopper pin 40 of the power source part P.

In the above-mentioned strobo flash apparatus of the present invention, a connecting and a disconnecting operation of the flashing part F to the power source part P are performed by sliding movement of them in back and forward direction indicated by an arrow A shown in FIG. 1(b). For connecting the flashing part F to the power source part P, a position of the edges 61a and 61b are led to engage with the grooves 21a and 22a of the connecting plate member 20 of the power source part P, and then the flashing part F is slid to backward direction indicated by an arrow $A_1$. The flashing part F slides on the power source part P engaging the protruding edges 61a and 62a of the flashing part F with the grooves 21a and 22a of the power source part P. Then the flashing part F reaches the connecting position where the contact pins 71a and 71b are inserted to the sockets 31a and 31b, respectively, while the stopper element 40 of the power source part P engages with the indent 90 of the flashing part F, and the protruding edge 63a of the flashing part F engages with the groove 23a of the power source part P.

Therefore, the flashing part F and the power source part P are tightly connected by the engagement of the protruding edges 61a, 62a, 63a and the grooves 21a, 22a, 23a. And at the same time, electrical connection is made by the sockets 31a, 31b of the power source part P and the contact pins 71a, 71b of the flashing part F. The play between the flashing part F and the power source part P can be almost prevented, and exact positioning of the flashing part F is attainable. In the power source part P, the sockets having contacts inside for supplying D.C. high voltage are formed hollowly in the front face of the socket supporting member 30. Therefore a user does not touch the D.C. high voltage and the user's safety can be assured. An electric shock from the contact pins 71a, 71b of the flashing part F can be easily prevented by inserting a diode in series to a charging circuit of the main capacitor.

Figure 2:
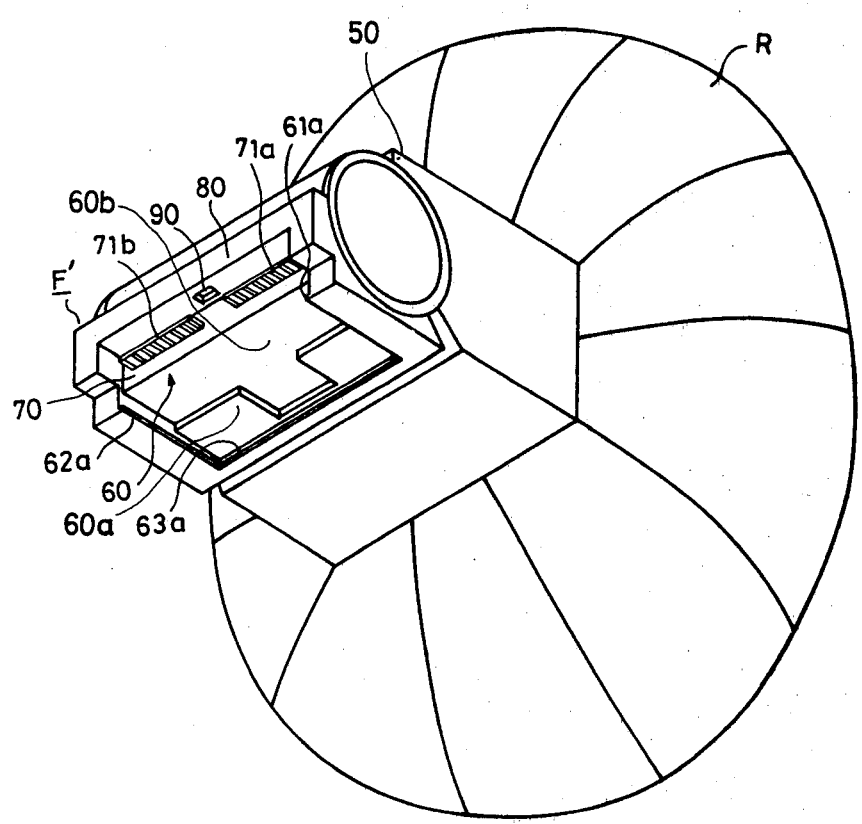
FIG. 2 is a perspective view showing a flashing part of a strobo flash apparatus of another embodiment of the present invention.

In the present invention, the power source part P is formed independent of flashing part F. Therefore, the power source part P can be adapted for a variety of flashing parts, for example, a parasol reflector type flashing part as shown in FIG. 2, a flashing parts wherein irradiation angle is electrically adjustable, an auxiliary flashing part of nondirectively type or other types. FIG. 2 is a perspective view showing a flashing part F' of a strobo flash apparatus of another embodiment of the present invention. In FIG. 2, every corresponding portions of FIG. 1(a) are indicated by the same reference numerals and signs. The flashing part F' has a parasol type refrector R.

According to the present invention, any user need not carry a variety of strobo flash apparatus since all of which can be used with a common power source part. And the apparatus of the present invention is very economical and of great utility.

And particularly in this embodiment of the present invention, the connecting plate member 20 is in stepshaped with front half part 20a being lower than the back half part 20b, and the connecting recess 60 has a step-shaped bottom face corresponding to the stepshaped connecting plate member 20. Therefore, the user can easily slide the connecting plate member 20 into the right position of the connecting recess 60 for coupling the connecting plate member 20 in the connecting recess 60 with sliding operation thereof.

What is claimed is:

1. A strobo flash apparatus having a power source part including a DC-DC converter circuit for inducing a D.C. high voltage and a flashing part including a flashing means,
   wherein said power source part formed separately from said flashing part comprising:
   a connecting plate member disposed on an upper face of a housing of said power source part and to form a grooves at least both at and under its right and left side edges thereof for a connection with said flashing part,
   sockets having contacts for supplying said D.C. high voltage and
   a stopper means having a stopper pin projected outside by an elasticity,
   and said flashing part comprising:
   a connecting recess formed on a housing of said flashing part correspondingly to said connecting plate,
   a protrusion formed on said housing of said flashing part for engaging with said grooves of said connecting plate,
   an indent formed on said housing of said flashing part for engaging with said stopper pin of said stopper means and
   contact pins projected outside from said housing of said flashing part for a connection with said socket.

2. A strobo flash apparatus in accordance with claim 1, wherein
   said connecting plate member is step-shaped with front half part being lower than the back half part, and
   said connecting recess has a step-shaped bottom face corresponding to said step-shaped connecting plate.

3. A strobo flash apparatus in accordance with claim 1, wherein
   said socket and said stopper means are disposed relatively backward on said housing of said power source part,
   said connecting recess is formed relatively backward on said housing of said flashing part,
   said contact pins are disposed at substantially back portion of said housing of said flashing part,
   for enabling sliding engagement and disengagement of said flashing part with said power source part for connection and disconnection in back and forth directions, respectively.

* * * * *